United States Patent
Frank et al.

(10) Patent No.: US 11,921,233 B2
(45) Date of Patent: Mar. 5, 2024

(54) ADAPTIVE RADAR FOR NEAR-FAR TARGET IDENTIFICATION

(71) Applicant: Metawave Corporation, Palo Alto, CA (US)

(72) Inventors: Mark Frank, Albuquerque, NM (US); Shoaib Mohammad Shafi, El Dorado Hills, CA (US)

(73) Assignee: Metawave Corporation, Carlsbad, CA (US)

( * ) Notice: Subject to any disclaimer, the term of this patent is extended or adjusted under 35 U.S.C. 154(b) by 439 days.

(21) Appl. No.: 16/591,506

(22) Filed: Oct. 2, 2019

(65) Prior Publication Data

US 2020/0103498 A1 Apr. 2, 2020

Related U.S. Application Data

(60) Provisional application No. 62/739,851, filed on Oct. 2, 2018.

(51) Int. Cl.
*G01S 7/41* (2006.01)
*G01S 13/58* (2006.01)

(52) U.S. Cl.
CPC .............. *G01S 7/411* (2013.01); *G01S 13/584* (2013.01)

(58) Field of Classification Search
CPC .......... G01S 13/931; G01S 7/023; G01S 7/40; G01S 13/04; G01S 2013/0245;
(Continued)

(56) References Cited

U.S. PATENT DOCUMENTS

| 5,565,870 A | * | 10/1996 | Fukuhara | G01S 7/2926 |
| | | | | 342/70 |
| 7,109,913 B1 | * | 9/2006 | Paramore | G01S 13/953 |
| | | | | 342/182 |

(Continued)

FOREIGN PATENT DOCUMENTS

WO WO-2018125139 A1 * 7/2018 ............. H04B 17/24

OTHER PUBLICATIONS

S. Patole et al., "Automotive Radars: A Review of Signal Processing Techniques," Signal Processing for Smart Vehicle Technologies: Part 2, in IEEE Signal Processing Magazine, pp. 22-35, Mar. 2017.

(Continued)

*Primary Examiner* — Olumide Ajibade Akonai

(57) ABSTRACT

Examples disclosed herein relate to an adaptive radar for near-far target identification. The radar includes an antenna module configured to radiate a transmission signal with an analog beamforming antenna in a plurality of directions using one or more phase control elements in a first radar scan and to generate radar data capturing a surrounding environment. The radar also includes a data pre-preprocessing module configured to receive the radar data and determine adjustments to transceiver parameters in the antenna module for a second radar scan subsequent to the first radar scan based at least on range. The radar also includes a perception module configured to detect and identify a target in the surrounding environment from the radar data. Other examples disclosed herein relate to methods of near-far target identification in a radar.

20 Claims, 7 Drawing Sheets

(58) Field of Classification Search
CPC ........ G01S 7/2813; G01S 7/34; G01S 13/584;
G01S 7/285; G01S 7/352; G01S 7/4008;
G01S 7/4026; G01S 7/4021; G01S 7/415;
G01S 13/88; G01S 7/417; G01S 13/56;
G01S 13/536; G01S 13/72; G01S 13/89;
G01S 13/582; G01S 7/2883; G01S
13/505; G01S 7/41; G01S 13/726; G01S
7/356; G01S 13/9064; G01S 13/904;
G01S 13/66; G01S 13/62; G01S 7/411;
G01S 7/4017; G06F 2218/08; G06F
2218/12; G06F 3/017; G06N 3/02
See application file for complete search history.

(56) References Cited

U.S. PATENT DOCUMENTS

| | | | | |
|---|---|---|---|---|
| 7,982,664 | B1* | 7/2011 | Uscinowicz | H01Q 3/267 342/174 |
| 8,902,103 | B2* | 12/2014 | Kim | G01S 13/345 342/134 |
| 8,947,294 | B1* | 2/2015 | Wasiewicz | G01S 13/28 342/162 |
| 9,753,121 | B1* | 9/2017 | Davis | G01S 7/0234 |
| 9,753,132 | B1* | 9/2017 | Bordes | G01S 13/931 |
| 9,791,564 | B1* | 10/2017 | Harris | G01S 13/34 |
| 2006/0012511 | A1* | 1/2006 | Dooi | G01S 13/87 342/111 |
| 2010/0277362 | A1* | 11/2010 | Wen | G01S 7/021 342/159 |
| 2013/0169470 | A1* | 7/2013 | Emery | G01S 7/412 342/91 |
| 2016/0033632 | A1* | 2/2016 | Searcy | G01S 13/424 342/153 |
| 2016/0349363 | A1* | 12/2016 | Millar | G01S 13/931 |
| 2017/0276770 | A1* | 9/2017 | Lin | H01Q 25/002 |
| 2017/0290011 | A1* | 10/2017 | Kushnir | H01Q 3/36 |
| 2018/0113196 | A1* | 4/2018 | Subburaj | G01S 13/34 |
| 2018/0252809 | A1* | 9/2018 | Davis | G01S 13/32 |
| 2019/0049556 | A1* | 2/2019 | Steinbuch | G01S 13/931 |
| 2019/0064337 | A1* | 2/2019 | Kim | G01S 13/9027 |
| 2019/0101634 | A1* | 4/2019 | Baheti | G01S 13/449 |
| 2019/0107616 | A1* | 4/2019 | Tsai | G01S 13/58 |
| 2019/0129004 | A1* | 5/2019 | Jaeger | G01S 7/352 |
| 2019/0195728 | A1* | 6/2019 | Santra | G01M 5/0091 |
| 2019/0302229 | A1* | 10/2019 | Ling | G01S 13/876 |
| 2019/0302252 | A1* | 10/2019 | Santra | G01F 1/663 |
| 2019/0361105 | A1* | 11/2019 | Kim | G01S 13/34 |
| 2019/0377062 | A1* | 12/2019 | Barkan | G01S 13/536 |
| 2020/0019160 | A1* | 1/2020 | McArthur | G01S 17/87 |

OTHER PUBLICATIONS

R. Rouveure et al., "Radar Imager for Perception and Mapping in Outdoor Environments," Advanced Concepts for Intelligent Vision Systems: 11th International Conference (ACIVS), Bordeaux, France, pp. 618-628, Sep. 2009.

M. A. Richards et al., " Principles of Modern Radar," vol. I: Basid Principles, SciTech Publishing, pp. 1-1124, 2010.

W. L. Melvin et al., "Principles of Modern Radar," vol. III: Radar Applications, SciTec Publishing, Edison, NJ, pp. 1-796, 2014.

* cited by examiner

ADAPTIVE RADAR FOR NEAR-FAR TARGET IDENTIFICATION

CROSS-REFERENCE TO RELATED APPLICATIONS

This application claims priority from U.S. Provisional Application No. 62/739,851, titled "ADAPTIVE RADAR FOR NEAR-FAR TARGET IDENTIFICATION," filed on Oct. 2, 2018, all of which is incorporated by reference herein.

BACKGROUND

Autonomous driving is quickly moving from the realm of science fiction to becoming an achievable reality. Already in the market are Advanced-Driver Assistance Systems ("ADAS") that automate, adapt and enhance vehicles for safety and better driving. The next step will be autonomous vehicles that increasingly assume control of driving functions and respond to events in their surrounding environment. For example, autonomous vehicles will be able to automatically change lanes or break in the presence of a weather-related event, road condition, traffic, and so on.

An aspect of making autonomous vehicles work is the ability to detect and classify targets in their path and surrounding environment at the same or possibly even better level as humans. Humans are adept at recognizing and perceiving the world around them with an extremely complex human visual system that essentially has two main functional parts: the eye and the brain. In autonomous driving technologies, the eye may include a combination of multiple sensors, such as camera, radar, and lidar, while the brain may involve multiple artificial intelligence, machine learning and deep learning systems. The goal is to have full understanding of a dynamic, fast-moving environment in real time and human-like intelligence to act in response to changes in the environment.

BRIEF DESCRIPTION OF THE DRAWINGS

The present application may be more fully appreciated in connection with the following detailed description taken in conjunction with the accompanying drawings, which may not be drawn to scale and in which like reference characters refer to like parts throughout, and wherein.

DETAILED DESCRIPTION

An adaptive radar for near-far target identification is disclosed. The adaptive radar is suitable for many different millimeter wave ("mm-wave") applications and can be deployed in a variety of different environments and configurations. Mm-wave applications are those operating with frequencies between 30 and 300 GHz or a portion thereof, including autonomous driving applications in the 77 GHz range and 5G applications in the 60 GHz range, among others. In various examples, the adaptive radar is incorporated in an autonomous vehicle to detect and identify targets in the vehicle's path and surrounding environment according to the targets' location.

Short range or near targets, i.e., targets at a relatively short distance (<100 m) relative to the radar's position, require a different set of radar transceiver parameters (e.g., transmit power, receive gain, etc.) than long range or far targets (≥100 m) to be properly detected and identified. The adaptive radar described herein adapts a set of transceiver parameters to improve target classification across ranges. The targets may include structural elements in the environment such as roads, walls, buildings, road center medians and other objects, as well as vehicles, pedestrians, bystanders, cyclists, plants, trees, animals and so on. The adaptive radar is truly a "digital eye" with 3D vision and human-like interpretation of the world.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced using one or more implementations. In one or more instances, structures and components are shown in block diagram form in order to avoid obscuring the concepts of the subject technology. In other instances, well-known methods and structures may not be described in detail to avoid unnecessarily obscuring the description of the examples. Also, the examples may be used in combination with each other.

Figure 1:
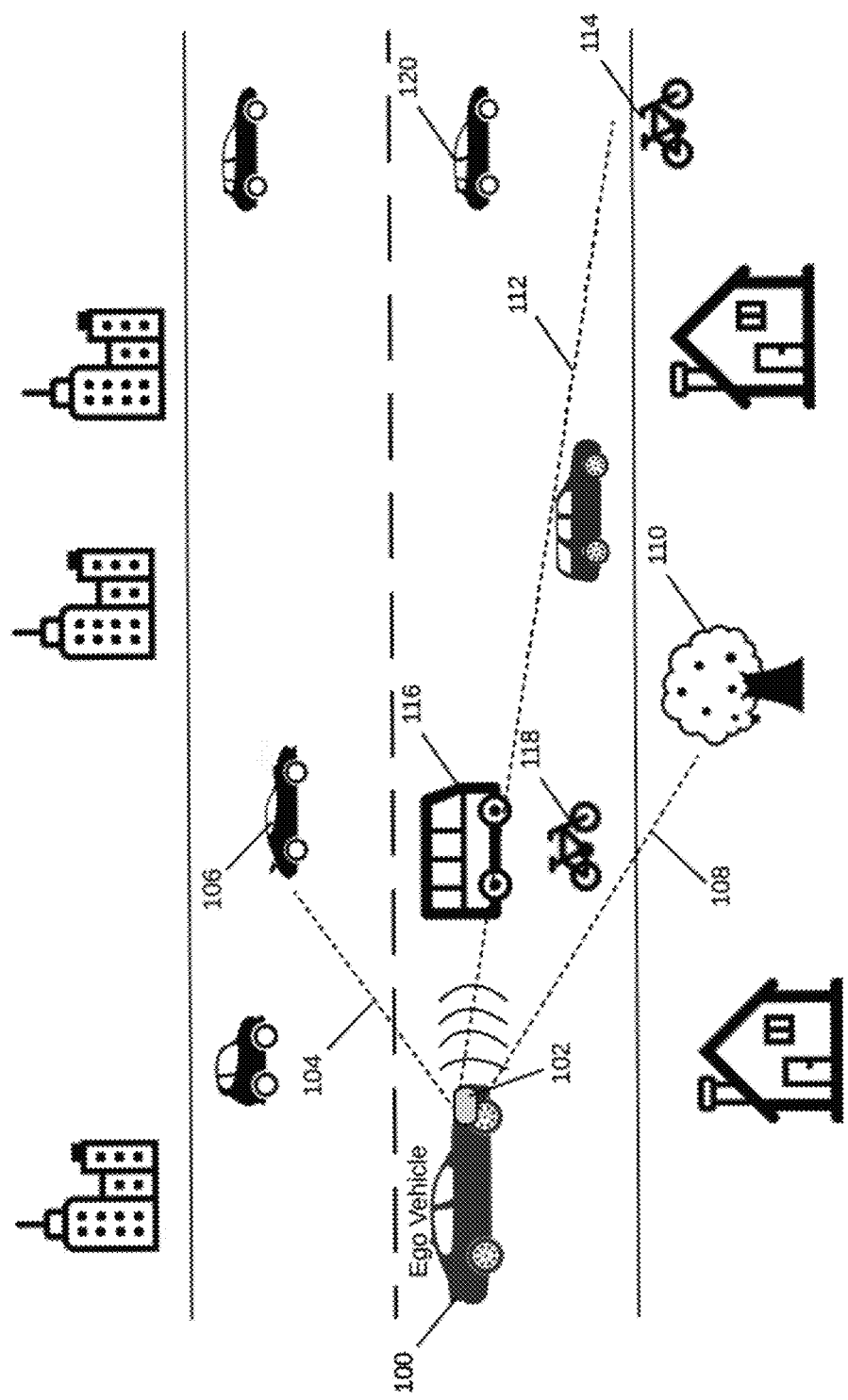
FIG. 1 is an example environment in which an adaptive radar for near-far target detection is implemented in an autonomous vehicle.

FIG. 1 illustrates an example environment in which an adaptive radar for near-far target detection is implemented in an autonomous vehicle. Ego vehicle 100 is an autonomous vehicle having an adaptive radar 102 capable of scanning a 360° FoV to detect and identify targets in the vehicle's path and surrounding environment. In various examples, radar 102 has an analog beamforming antenna that radiates dynamically controllable and highly-directive RF beams. The RF beams reflect off of targets in the vehicle's path and surrounding environment and the RF reflections are received by the radar 102 for target detection and identification.

In the illustrated example, radar 102 generates a beam 104 to detect vehicle 106, a beam 108 to detect tree 110 and a beam 112 to detect bicycle 114. Each of the beams 104, 108 and 112 is generated with a set of parameters, such as beam width and phase. The phase of each beam is controlled by Phase Control Elements ("PCEs") in the analog beamforming antenna in radar 102. A PCE may include a varactor, a set of varactors, a phase shift network, or a vector modulator architecture to achieve any desired phase shift from 0° to 360°.

Targets detected and identified by radar 102 may be positioned in short (<100 m from the radar 102) ranges, such as bus 116 and bicycle 118 in close proximity to vehicle 100, or long ranges (~100≤range≤300 m), e.g., car 120. The operation of radar 102 is governed by a radar range equation, which relates the received power to the transmit power, target range, and the reflecting characteristics of the target measured by the radar cross-section ("RCS"), as follows:

$$P_r = \frac{P_t G_t G_r \sigma A_{er}}{(4\pi R^2)^2} \quad \text{(Eq. 1)}$$

where $P_r$ is the received power, $P_t$ is the transmitter power, $G_t$ is the gain of the transmit antenna, $G_r$ is the gain of the receive antenna, $\sigma$ is the RCS, R is the range or distance from the target to the radar 102, and $A_{er}$ is the effective aperture of the receive antenna. The received power $P_r$ is thus inversely proportional to the target range to the fourth power. Accordingly, for detecting targets at long ranges, the effective transmit power of the radar 102, i.e., $P_t*G_t$, or the receiver gain $G_r$ needs to be increased. However, if the transmit power or the receiver gain is increased so as to detect far-range targets, the power received from some short range targets may swamp the receiver processing chain, and thus mask any other targets at the shorter ranges having low RCS values. For example, if the power is increased to better detect and identify car 120, the power received from short range bus 116 may mask the power received from bicycle 118. As described in more detail below, radar 102 therefore adapts its transceiver parameters such as transmit power and receiver gain to address this inherent near-far problem of radar detection. The adaptation performed ensures proper detection and identification of both short range and long range targets.

Figure 2:
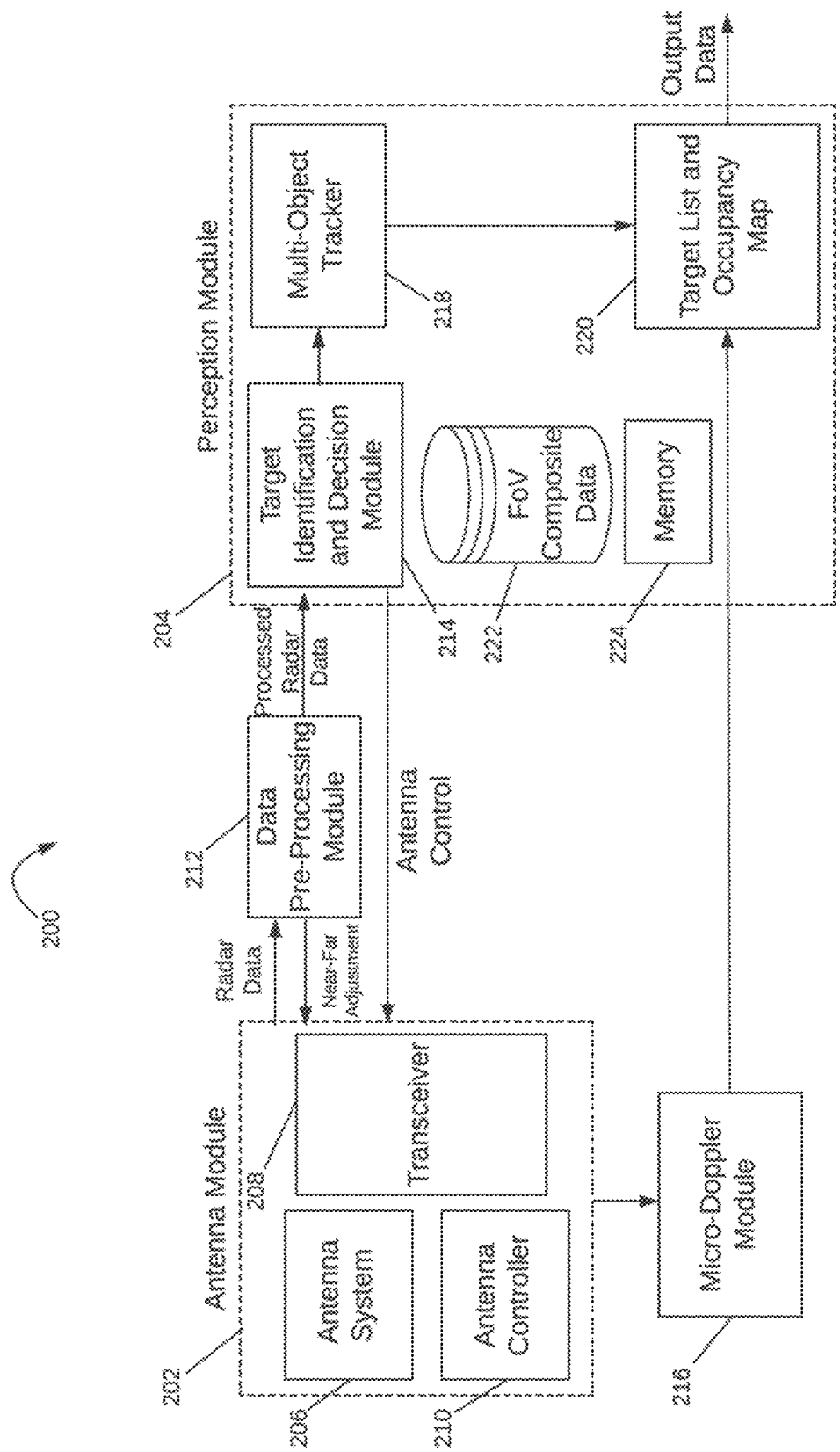
FIG. 2 illustrates a schematic diagram of an adaptive radar system for use in an autonomous driving system in accordance with various examples.

Referring now to FIG. 2, a schematic diagram of an adaptive radar system for use in an autonomous driving system in accordance with various examples is described. Adaptive radar system 200 is a "digital eye" with true 3D vision and capable of a human-like interpretation of the world. The "digital eye" and human-like interpretation capabilities are provided by two main modules: Antenna Module 202 and Perception Module 204.

Antenna module 202 has an antenna system 206 to radiate dynamically controllable and highly-directive RF beams. A transceiver module 208 coupled to the antenna system 206 prepares a signal for transmission, such as a signal for a radar device, wherein the signal is defined by modulation and frequency. The signal is provided to the antenna system 206 through a coaxial cable or other connector and propagates through the antenna structure for transmission through the air via RF beams at a given phase, direction, and so on. The RF beams and their parameters (e.g., beam width, phase, azimuth and elevation angles, etc.) are controlled by antenna controller 210, such as at the direction of perception module 204.

The RF beams reflect off of targets in the vehicle's path and surrounding environment and the RF reflections are received by the transceiver module 208. Radar data from the received RF beams is provided to the perception module 204 for target detection and identification. A data pre-processing module 212 processes the radar data, determines any near-far adjustments of transceiver parameters (e.g., transmit power, receiver gain, etc.) and encodes the processed radar data for the perception module 204. In various examples, the data pre-processing module 212 could be a part of the antenna module 206 or the perception module 204, such as on the same circuit board as the other modules within the antenna or perception modules 202-204. The data pre-preprocessing module 212 may process the radar data through an autoencoder, a non-line-of-sight network, or a combination of neural networks for improving the training and performance of the perception module 204.

Note that in some examples, the radar 200 may be adjusted so as to perform near-far adjustments automatically. That is, instead of relying on data pre-processing engine 212 to determine whether and how to perform any adjustment of transceiver parameters depending on the radar data, the transceiver 208 may be configured so as to adjust its parameters periodically or from scan to scan. For example, in one scan, the transceiver 208 may be configured with a transmit power that is suitable for long range target detection and identification. At the next scan, the transceiver 208 changes its transmit power to focus on short range targets. Scanning may thus alternate between short range and long range targets automatically.

The radar data is organized in sets of Range-Doppler ("RD") map information, corresponding to 4D information that is determined by each RF beam radiated off of targets, such as azimuthal angles, elevation angles, range, and velocity. The RD maps may be extracted from Frequency-Modulated Continuous Wave ("FMCW") radar pulses and contain both noise and systematic artifacts from Fourier analysis of the pulses. In various examples, the radar data is organized in RD map images with targets shown with different intensities across ranges and velocities. The perception module 204 controls further operation of the antenna module 202 by, for example, providing beam parameters for the next RF beams to be radiated from the antenna system 206.

In operation, the antenna controller 210 is responsible for directing the antenna system 206 to generate RF beams with determined parameters such as beam width, transmit angle, and so on. The antenna controller 210 may, for example, determine the parameters at the direction of the data pre-processing module 212, which determines whether near-far adjustments of transceiver parameters (e.g., transmit power, receiver gain, etc.) need to be performed. Antenna controller 210 may also operate at the direction of the perception module 204, which may at any given time want to focus on a specific area of an FoV upon identifying targets of interest in the vehicle's path or surrounding environment. The antenna controller 210 determines the direction, power, and other parameters of the beams and controls the antenna system 206 to achieve beam steering in various directions. The antenna controller 210 also determines a voltage matrix to apply to reactance control mechanisms in the antenna system 206 to achieve a given phase shift. Perception module 204 provides control actions to the antenna controller 210 at the direction of the Target Identification and Decision Module 214.

Next, the antenna system 206 radiates RF beams having the determined parameters. The RF beams are reflected off of targets in and around the vehicle's path (e.g., in a 360° field of view) and are received by the transceiver module 208 in antenna module 202. The antenna module 202 transmits the received radar data to the data pre-processing module 212, which then determines whether to adjust the transmit power or the receiver gain in the transceiver module 208 for a subsequent radar scan. Processed radar data is then encoded and sent to the perception module 204.

A micro-doppler module 216 coupled to the antenna module 202 and the perception module 204 extracts micro-doppler signals from the radar data to aid in the identification of targets by the perception module 204. The micro-doppler module 216 takes a series of RD maps from the antenna module 202 and extracts a micro-doppler signal from them. The micro-doppler signal enables a more accurate identification of targets as it provides information on the occupancy of a target in various directions. Non-rigid targets such as pedestrians and cyclists are known to exhibit a time-varying doppler signature due to swinging arms, legs, etc. By analyzing the frequency of the returned radar signal over time, it is possible to determine the class of the target (i.e., whether a vehicle, pedestrian, cyclist, animal, etc.) with over 90% accuracy. Further, as this classification may be performed by a linear Support Vector Machine ("SVM"), it is extremely computationally efficient. In various examples, the micro-doppler module 216 could be a part of the antenna module 202 or the perception module 204, such as on the same circuit board as the other modules within the antenna system 206 or modules 202-204.

The target identification and decision module 214 receives the encoded radar data from the data pre-processing module 212, processes the encoded data to detect and identify targets, and determines the control actions to be performed by the antenna module 202 based on the detection and identification of such targets. For example, the target identification and decision module 214 may detect a cyclist on the path of the vehicle and direct the antenna module 202, at the instruction of its antenna controller 210, to focus additional RF beams at a given phase shift and direction within the portion of the FoV corresponding to the cyclist's location.

The perception module 204 may also include a multi-object tracker 218 to track the identified targets over time, such as, for example, with the use of a Kalman filter. The multi-object tracker 218 matches candidate targets identified by the target identification and decision module 214 with targets it has detected in previous time windows. By combining information from previous measurements, expected measurement uncertainties, and some physical knowledge, the multi-object tracker 218 generates robust, accurate estimates of target locations. Information on identified targets over time are then stored at a Target List and Occupancy Map 220, which keeps tracks of targets' locations and their movement over time as determined by the multi-object tracker 218. The tracking information provided by the multi-object tracker 218 and the micro-doppler signal provided by the micro-doppler module 216 are combined to produce an output containing the type/class of target identified, their location, their velocity, and so on. This information from the radar system 200 is then sent to a sensor fusion module in the vehicle, where it is processed together with information from other sensors (e.g., lidars, cameras, etc.) in the vehicle. The result of the processing informs the vehicle of what driving and control actions to perform next.

In various examples, an FoV composite data unit 222 stores information that describes an FoV. This may be historical data used to track trends and anticipate behaviors and traffic conditions or may be instantaneous or real-time data that describes the FoV at a moment in time or over a window in time. The ability to store this data enables the perception module 204 to make decisions that are strategically targeted at a particular point or area within the FoV. For example, the FoV may be clear (no echoes received) for five minutes, and then one echo arrives from a specific region in the FoV; this is similar to detecting the front of a car. In response, the perception module 204 may determine to narrow the beam width for a more focused view of that sector or area in the FoV. The next scan may indicate the targets' length or other dimension, and if the target is a car, the perception module 204 may consider what direction the target is moving and focus the beams on that area.

The perception module 204 may also instruct the antenna system 206 to produce wider RF beams if it finds targets at close range, e.g., <100 m away. Similarly, the echo may be from a spurious target, such as a bird, which is small and moving quickly out of the path of the car. In this case, the perception module 204 may instruct the antenna system 206 to generate narrower RF beams to improve the identification of the target at farther ranges. There are a variety of other uses for the FoV composite data 222, including the ability to identify a specific type of target based on previous detection. A memory 224 stores useful data for the radar system 200, such as, for example, information on which subarrays of the antenna system 206 perform better under different conditions.

In various examples described herein, the use of radar system 200 in an autonomous driving vehicle provides a reliable way to detect targets in difficult weather conditions. For example, historically a driver will slow down dramatically in thick fog, as the driving speed decreases with decreases in visibility. On a highway in Europe, for example, where the speed limit is 115 km/h, a driver may need to slow down to 40 km/h when visibility is poor. Using the radar system 200, the driver (or driverless vehicle) may maintain the maximum safe speed without regard to the weather conditions. Even if other drivers slow down, a vehicle enabled with the radar system 200 will be able to detect those slow-moving vehicles and obstacles in the way and avoid/navigate around them.

Additionally, in highly congested areas, it is necessary for an autonomous vehicle to detect targets in sufficient time to react and take action. The examples provided herein for a radar system increase the sweep time of a radar signal so as to detect any echoes in time to react. In rural areas and other areas with few obstacles during travel, the perception module 204 instructs the antenna system 206 to adjust the focus of the beam to a larger beam width, thereby enabling a faster scan of areas where there are few echoes. The perception module 204 may detect this situation by evaluating the number of echoes received within a given time period and making beam size adjustments accordingly. Once a target is detected, the perception module 204 determines how to adjust the beam focus. This is achieved by changing the specific configurations and conditions of the antenna system 206.

All of these detection scenarios, analysis and reactions may be stored in the perception module 204 and used for later analysis or simplified reactions. For example, if there is an increase in the echoes received at a given time of day or on a specific highway, that information is fed into the antenna controller 210 to assist in proactive preparation and configuration of the antenna system 206. Additionally, there may be some subarray combinations that perform better, such as to achieve a desired result, and this is stored in the memory 124.

Figure 3:
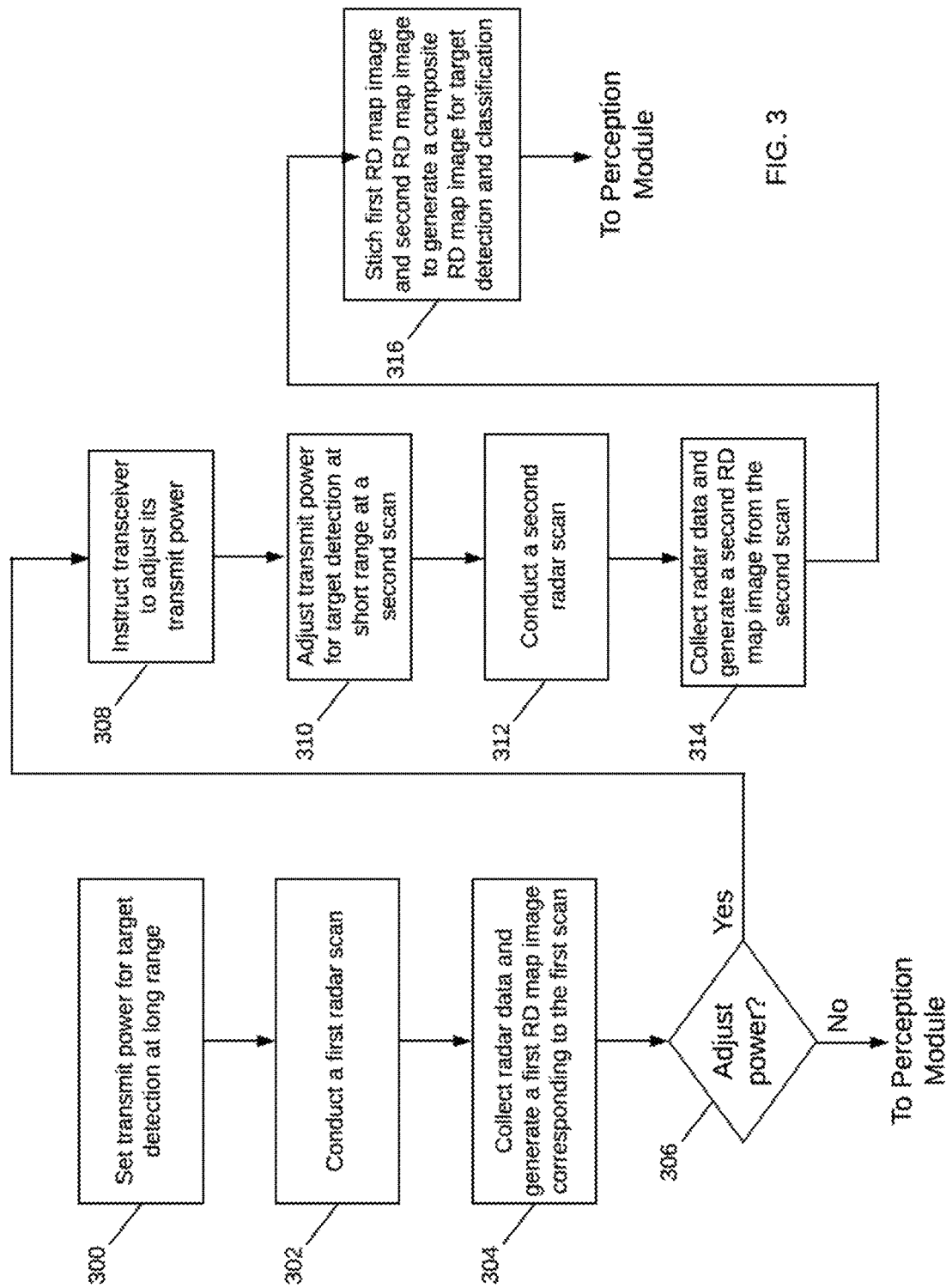
FIG. 3 is a flowchart for adapting a transmit power in an adaptive radar system implemented as in FIG. 2 and in accordance with various examples.

Attention is now directed to FIG. 3, which shows a flowchart for adapting a transmit power in an adaptive radar system implemented as in FIG. 2 and in accordance with various examples. The adaptive radar system, e.g., radar system 200, has a transceiver with one or more transmit and one or more receive antennas. First, a transmit power in a transmit antenna is set at a value suitable for target detection at long range (300). The adaptive radar conducts a first scan with RF beams at the designated transmit power at the direction of its antenna controller 210 (302) and generates a first RD map image corresponding to the received target reflections from the RF beams (304). The RD map image is processed by the data pre-processing module to determine whether to adjust the transmit power and improve detection and identification of short range targets (306). If an adjustment is needed, the data pre-processing module 212 sends an indication to the transceiver 208 to adjust the transmit power level for a second scan (308). The transceiver then adjusts the transmit power accordingly (310) and the adaptive radar conducts a second scan with the adjusted transmit power (312). The adaptive radar receives the target reflections and generates a second RD map image (314). With the first RD map image generated with a transmit power suitable for long range target detection and the second RD map image generated with a transmit power suitable for short range target detection, the next step is for the two images to be stitched together (316). Doing so generates a composite image that shows both short range and long range targets and facilitates their detection and identification by the perception module 204.

Figure 4:
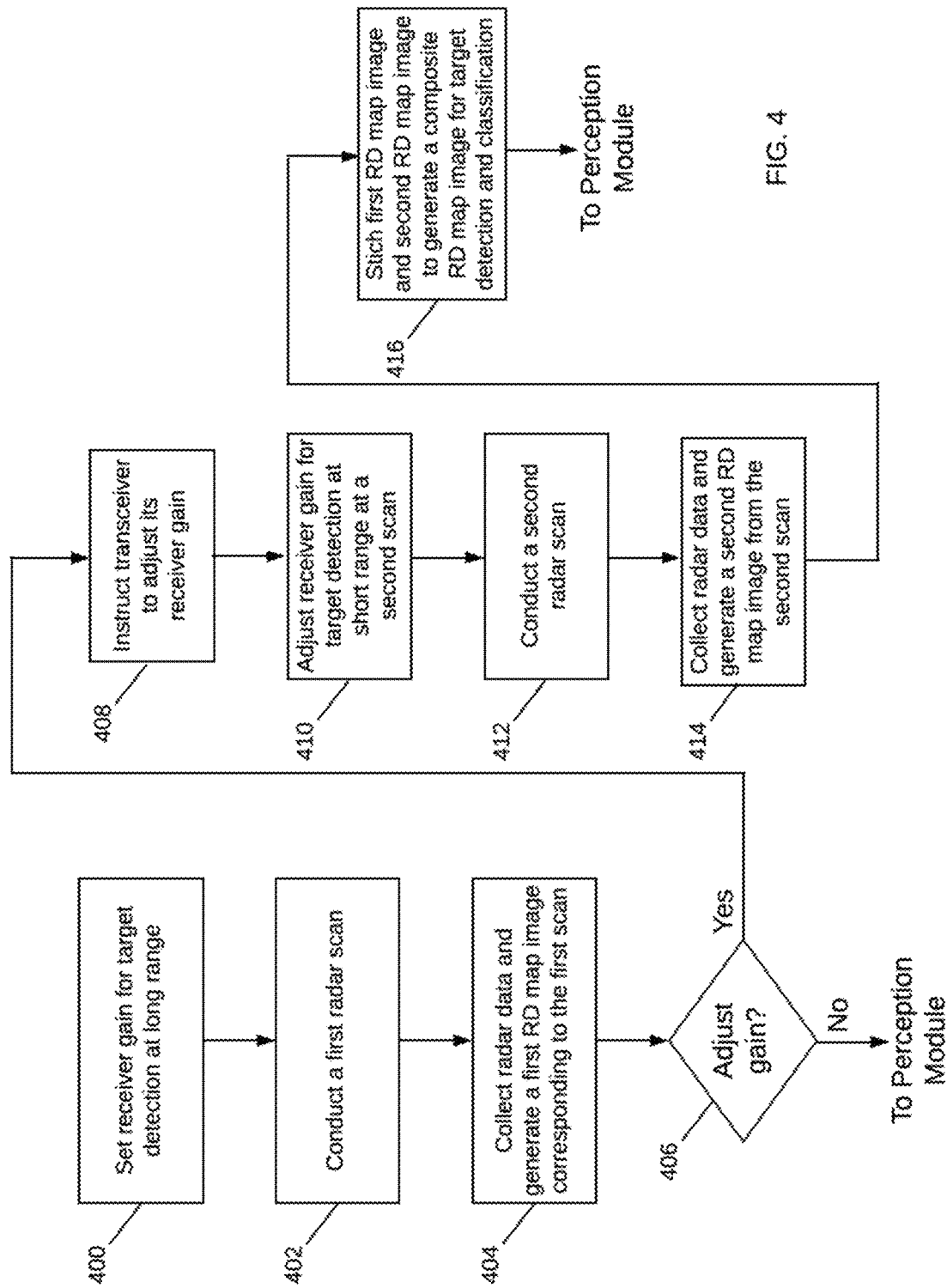
FIG. 4 is a flowchart for adapting a receiver gain in an adaptive radar system implemented as in FIG. 2 and in accordance with various examples.

Note that instead of adjusting the transmit power, Eq. 1 shows that the power received by the radar 200 can also be affected by its receiver gain. Accordingly, FIG. 4 illustrates a similar flowchart to FIG. 3, except that instead of adjusting the transmitter power, the radar system adapts its receive antenna gain according to range. First, the gain in the antenna receiver chain in radar 200 is set at a value suitable for target detection at long range (400). The adaptive radar conducts a first scan with RF beams at the designated receiver gain at the direction of its antenna controller 210 (402) and generates a first RD map image corresponding to the received target reflections from the RF beams (404). The RD map image is processed by the data pre-processing module 212 to determine whether to adjust the receiver gain and improve detection and identification of short range targets (406).

If an adjustment is needed, the data pre-processing module 212 sends an indication to the transceiver 208 to adjust the receive antenna gain for a second scan (408). The transceiver then adjusts the receiver gain accordingly (410) and the adaptive radar conducts a second scan with the adjusted receiver gain (412). The adaptive radar receives the target reflections and generates a second RD map image (414). The next step is then for the two images to be stitched together (416). Doing so generates a composite image that shows both short range and long range targets and facilitates their detection and identification by the perception module 204.

Figure 5:
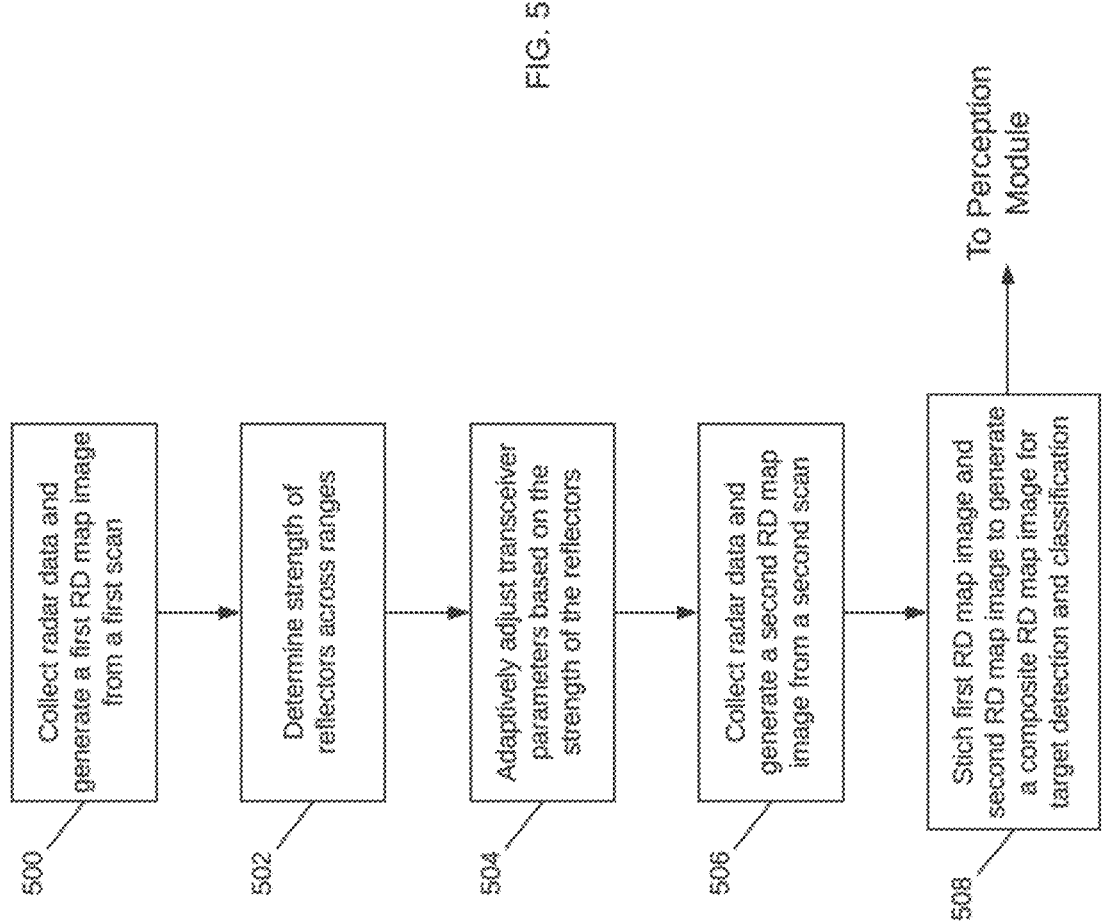
FIG. 5 is a flowchart for adjusting transceiver parameters in an adaptive radar system implemented as in FIG. 2 and in accordance with various examples.

Note that in either FIG. 3 or FIG. 4, a single transceiver parameter is adjusted to improve target detection and identification: the transmit power is adjusted in FIG. 3 and the receiver gain is adjusted in FIG. 4. In various examples, either parameter may be adjusted interchangeably depending on the strength of the received RF beams from targets at short and long ranges. FIG. 5 illustrates a flowchart for adaptively adjusting either the transmit power or the receiver gain. The radar system 200 conducts a first scan to collect radar data and generate a first RD map image (500). The RD map image is processed by the data pre-processing module 212 to determine the strength of the reflected signals across ranges (502). Based on this determination, the transceiver parameters are adaptively adjusted (504). For example, if the data pre-processing module 212 determines that there is a strong reflector at a close in range and no weak reflectors at the far ranges, then either the transmit power or the receiver gain may be adjusted. The radar system 200 then conducts a second scan to generate a second RD map image with the adjusted transceiver parameters (506). Lastly, the first and second RD map images are stitched together to generate a composite image for better target detection and identification (508).

Figure 6:
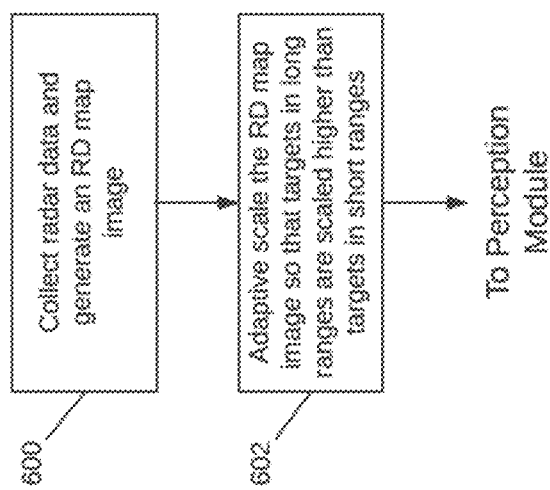
FIG. 6 is a flowchart for adaptively scaling RD map images in an adaptive radar system implemented as in FIG. 2 and in accordance with various examples.

Note that in FIGS. 3-5, an adjustment of a transceiver parameter is made over two subsequent radar scans to better detect and identify targets positioned in either short or long ranges. In practice, adjustments over 3, 4, 5, or more scans can be made at the expense of a longer update time in the radar. The more adjustments, the more RD map images have to be stitched together to generate a composite image. Alternatively, another approach that does not involve adjusting transceiver parameters is illustrated in FIG. 6. In this approach, radar data is collected at each scan to generate an RD map image (600) that is then adaptively scaled (602). The adaptive scaling is performed so that targets in long ranges are scaled higher than targets in short ranges. In various examples, this adaptive scaling can also be performed in FIGS. 3-5 to further highlight the contributions of targets in the different ranges if needed.

Figure 7:
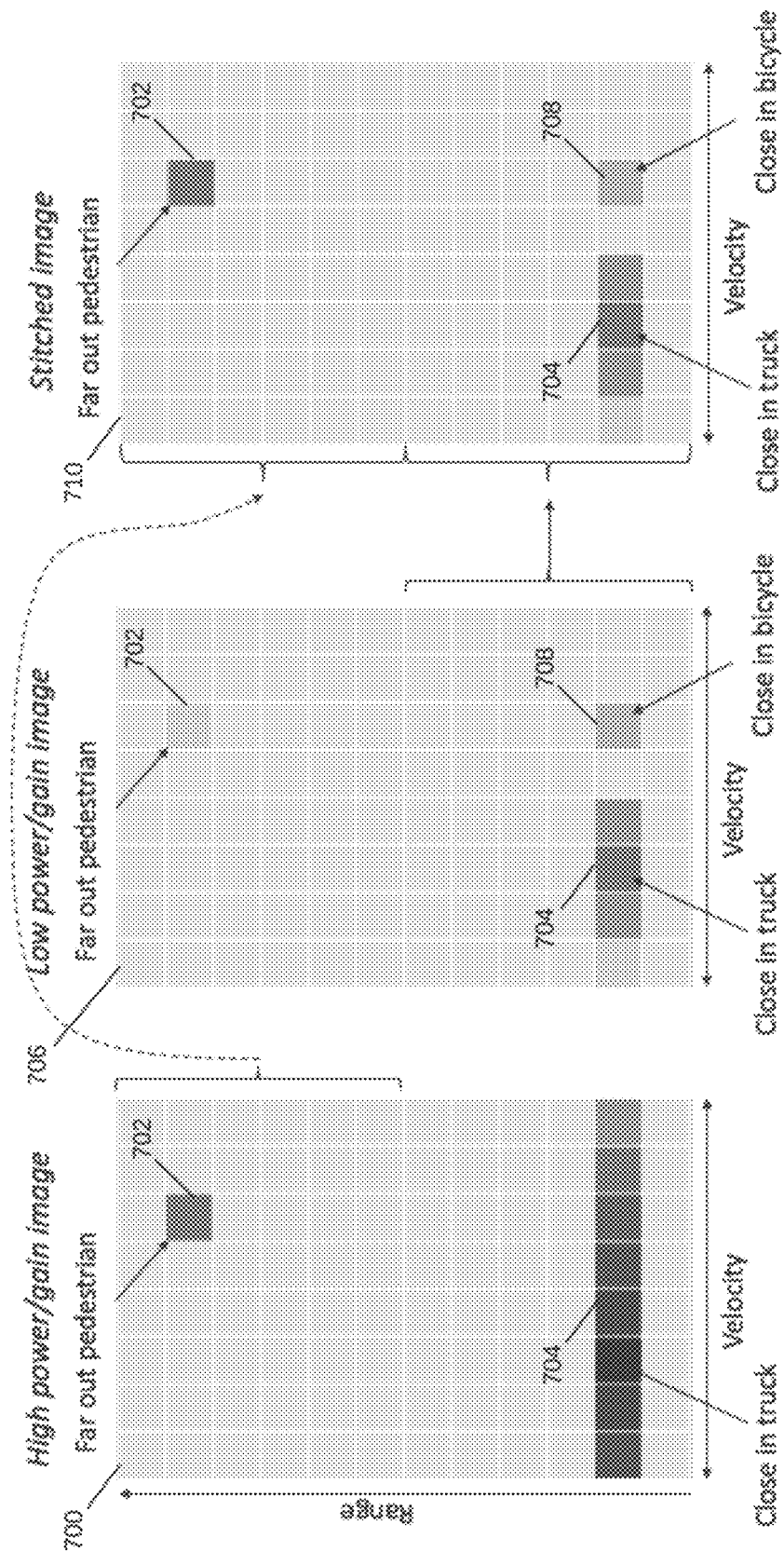
FIG. 7 is a schematic diagram of RD map images collected by an adaptive radar system implemented as in FIG. 2 and in accordance with various examples.

Attention is now directed to FIG. 7, which shows example RD map images collected by an adaptive radar system implemented as in FIG. 2. Image 700 is an RD map image collected in a first radar scan with high transmit power or high receiver gain to better detect and identify targets in long ranges. At these power levels, the radar 200 is able to detect a far out pedestrian 702, even at the presence of a dominant reflector such as a close in truck 704. At a subsequent scan, the transmit power or the receiver gain are adjusted as described above with reference to FIGS. 3-5. In image 706, the transmit power or the receiver gain has been lowered to better detect and identify all targets in short ranges in such a way that strong reflectors in short ranges do not mask weak reflectors. The lowering of the transmit power or the receiver gain enables bicycle 708 to be seen in image 706 even with the presence of truck 704. When the two images 702-704 are stitched together to generate composite image 710, both short and long range targets are observed in the image. As a result, the composite image 710 facilitates and improves the detection and identification of targets by perception module 204. In various examples, perception module 204 may use just the composite image 710 or all three images 700, 706 and 710 to detect and properly identify the targets thereon in their different categories of truck, bicycle, pedestrian, car, and so on.

It is appreciated that the radar system 200 of FIG. 2 may implement the various aspects, configurations, processes and modules described throughout this description. The radar system 200 is configured for placement in an autonomous driving system or in another structure in an environment (e.g., buildings, bill boards along roads, road signs, traffic lights, etc.) to complement and supplement information of individual vehicles, devices and so forth. The radar system 200 scans the environment, and may incorporate infrastructure information and data, to alert drivers and vehicles as to conditions in their path or surrounding environment. The radar system is also able to identify targets and actions within the environment. The various examples described herein support autonomous driving with improved sensor performance, all-weather/all-condition detection, advanced decision-making algorithms and interaction with other sensors through sensor fusion. The radar system 200 leverages novel antenna structures and AI techniques to create a truly intelligent digital eye for autonomous vehicles.

It is also appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Furthermore, to the extent that the term "include," "have," or the like is used in the description or the claims, such term is intended to be inclusive in a manner similar to the term "comprise" as "comprise" is interpreted when employed as a transitional word in a claim.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. Moreover, the separation of various system components in the aspects described above should not be understood as requiring such separation in all aspects, and it should be understood that the described program components and systems can generally be integrated together in a single hardware product or packaged into multiple hardware products. Other variations are within the scope of the following claim.

What is claimed is:

1. An adaptive radar for near-far target identification, comprising:
    an antenna module configured to radiate a transmission signal with an analog beamforming antenna in a plurality of directions using one or more phase control elements in a first radar scan and to generate radar data capturing a surrounding environment of a vehicle's path;
    a data pre-preprocessing module configured to receive the radar data and determine adjustments to at least one transceiver parameter in the antenna module for a second radar scan subsequent to the first radar scan based at least on range to regenerate radar data capturing the surrounding environment; and
    a perception module configured to detect and identify targets in the surrounding environment from the radar data of the first radar scan and the regenerated radar data of the second radar scan, wherein the perception module is further configured to:
        generate a first Range-Doppler ("RD") map image corresponding to the first radar scan,
        generate a second RD map image corresponding to the second radar scan,
        adaptively scale the second RD map image with respect to the first RD map image,
        stitch the first RD map image with the adaptively scaled second RD map image,
        generate a composite image that comprises the stitched first and adaptively scaled second RD map images, and
        focus at least one radar scan on a specific area of a field of view upon identifying targets in the vehicle's path.

2. The adaptive radar of claim 1, wherein the at least one transceiver parameter comprises a transmit power in a transmit antenna in the antenna module, wherein the perception module further comprises:
    a target identification and decision module adapted to:
        receive encoded data,
        detect and identify the targets, and
        provide control actions to the adaptive radar based on a detection of the identified targets; and
    a target list and occupancy map adapted to:
        store information on the identified targets and track their movement over time.

3. The adaptive radar of claim 1, wherein the at least one transceiver parameter comprises a receive gain in a receive antenna in the antenna module, and wherein the perception module provides control instructions to adjust the receive gain for the second scan.

4. The adaptive radar of claim 1, wherein the data pre-processing module is further configured to:
    process the radar data from the antenna module;
    determine a near-far adjustment to the at least one transceiver parameter;
    encode the processed radar data with the near-far adjustment; and send an indication of the encoded radar data to the antenna module to perform a subsequent radar scan with the near-far adjustment.

5. The adaptive radar of claim 1, wherein the data pre-processing module is further configured to determine whether to adjust a transmit power or a receive gain in a transceiver module in the antenna module for a subsequent radar scan.

6. The adaptive radar of claim 1, wherein the perception module is further configured to:
iteratively generate an updated composite image by further stitching one or more additional individual images of the targets with the composite image at near and far ranges, and
detect and identify the targets based on the iteratively generated updated composite image, wherein the adaptive radar is further configured to use the iteratively generated updated composite image from the field of view to identify a specific type of target based on a previous detection.

7. A method of near-far target identification in a radar, the method comprising:
setting one or more parameters associated with a transceiver for target detection at a first range;
conducting a first scan of an area associated a vehicle's path;
generating, based on the first scan, a first Range-Doppler ("RD") map image corresponding to first received target reflections;
processing the first RD map image with a data pre-processing module coupled to the transceiver;
adjusting the one or more parameters associated with the transceiver for target detection at a second range different from the first range;
conducting a second scan;
generating, based on the second scan, a second RD map image corresponding to second received target reflections;
adaptively scaling the second RD map image with respect to the first RD map image;
stitching the first RD map image with the adaptively scaled second RD map image;
generating a composite RD map image that comprises the stitched first and adaptively scaled second RD map images;
detecting and identifying targets using the composite RD map image; and
focusing at least one radar scan on a specific area of a field of view upon identifying targets in the vehicle's path.

8. The method of claim 7, further comprising:
determining whether an adjustment to the one or more parameters is required based on the processed first RD map image; and
sending an indication to the transceiver with the data pre-processing module to adjust one or more of a transmit power level or a receive gain level for the second scan when the adjustment to the one or more parameters is required.

9. The method of claim 7, wherein setting the one or more parameters associated with the transceiver comprises:
setting a transmitter parameter to a predetermined transmit power level in a transmitter path of the transceiver; and
setting a receiver parameter to a predetermined receive gain level in a receiver path of the transceiver.

10. The method of claim 9, wherein conducting the first scan comprises transmitting first radio frequency (RF) beams at the predetermined transmit power level based at least on a control signal from an antenna controller coupled to the transceiver.

11. The method of claim 10, further comprising obtaining first received target reflections from the first RF beams transmitted at the predetermined transmit power level.

12. The method of claim 10, wherein adjusting the one or more parameters associated with the transceiver comprises:
adjusting a transmitter power parameter from the predetermined transmit power level to an adjusted transmit power level in a transmitter path of the transceiver; and
transmitting second RF beams at the adjusted transmit power level.

13. The method of claim 9, wherein adjusting the one or more parameters associated with the transceiver comprises:
adjusting a receiver gain parameter from the predetermined receive gain level to an adjusted receive gain level in a receiver path of the transceiver; and
obtaining second received target reflections at the adjusted receive gain level from the first RF beams transmitted at the predetermined transmit power level.

14. The method of claim 9, further comprising:
receiving RF return beams with receiver antennas at the predetermined receive gain level based at least on the control signal from an antenna controller coupled to the transceiver;
generating the first RD map image from radar data associated with the received RF return beams;
processing the first RD map image with the data pre-processing module; and
determining whether adjustment to a receiver gain in a receive path of the transceiver is required based at least on the processed first RD map image.

15. The method of claim 14, further comprising:
sending an indication to the transceiver with the data pre-processing module to adjust the receiver gain for a subsequent scan when adjustment to the receiver gain is required;
adjusting the receiver gain based at least on processing results of the first RD map image; and
conducting a subsequent scan with the adjusted receiver gain.

16. The method of claim 14, further comprising adjusting the one or more parameters interchangeably based at least on a signal strength of the received RF return beams from targets at first and second ranges.

17. The method of claim 7, further comprising:
collecting radar data of at least one scan;
generating an RD map image from the collected radar data; and
adaptively scaling the RD map image to adjust the one or more parameters associated with the transceiver.

18. A method of near-far target identification in a radar, the method comprising:
conducting a first scan;
based on the first scan, collecting radar data and generating a first Range-Doppler (RD) map image;
processing the first RD map image with a data pre-processing module;
determining, based on the processing, a signal strength of reflected RF signals across a range of frequencies;
adaptively adjusting transceiver parameters based at least on the processed first RD map image;
conducting a second scan with the adjusted transceiver parameter;
generating, based on the second scan, a second RD map image;

adaptively scaling the second RD map image with respect to the first RD map image;

stitching the first RD map image with the adaptively scaled second RD map image;

generating a composite image that comprises the stitched first and adaptively scaled second RD map image;

extracting micro-doppler signal from the composite image; and performing a target classification based on the extracted micro-doppler signal from the composite image.

19. The method of claim 18, further comprising adjusting one or more of a transmit power or a receiver gain when a determination is made that there is a strong reflector at a near range and no weak reflector at a far range.

20. The method of claim 19, wherein adjusting the one or more of the transmit power or the receiver gain comprises decreasing the transmit power or the receiver gain to increase detection of targets in the near range such that a presence of the strong reflector in the near range does not mask a weak reflector in the near range.

* * * * *